(No Model.) 4 Sheets—Sheet 2.
J. H. PAGE.
LAYING UNDERGROUND ELECTRIC WIRES.
No. 298,020. Patented May 6, 1884.
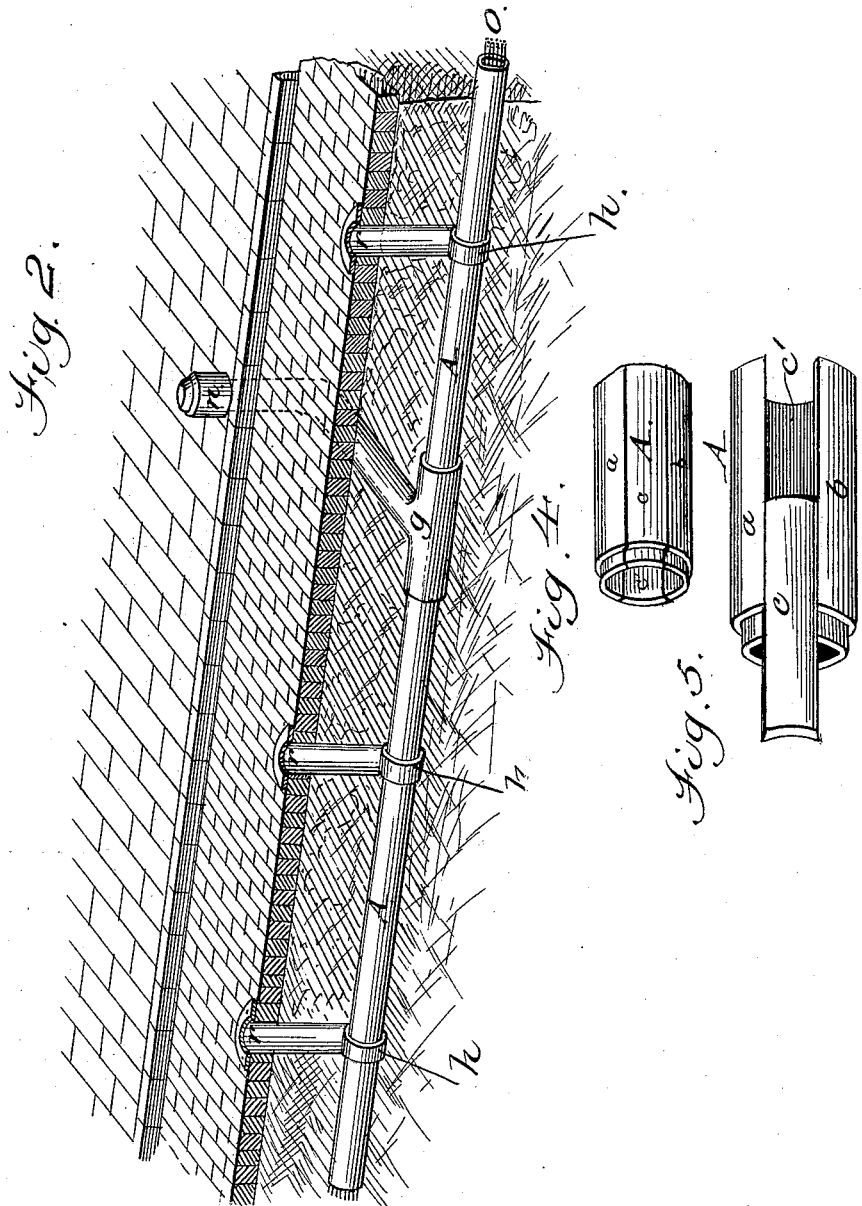
Attest;
S. Walter Fowler,
Henry Glassie
Inventor;
Joel H. Page
By Henry Glassie
his attorney (No Model.) 4 Sheets—Sheet 3.
J. H. PAGE.
LAYING UNDERGROUND ELECTRIC WIRES.
No. 298,020. Patented May 6, 1884.
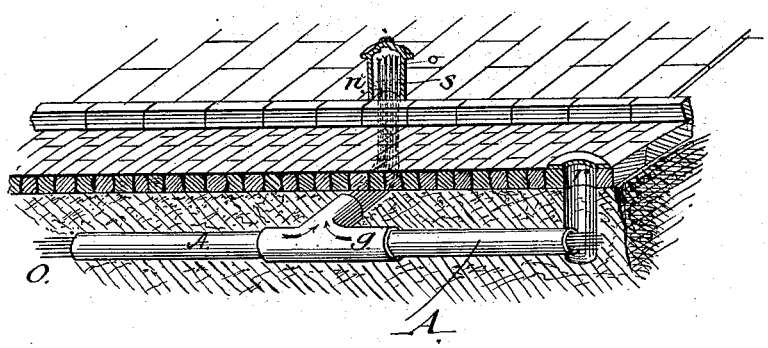
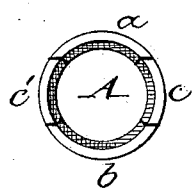
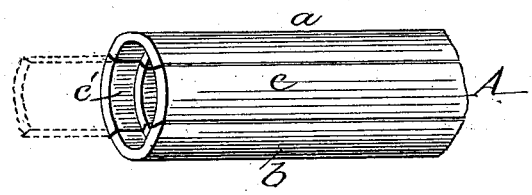
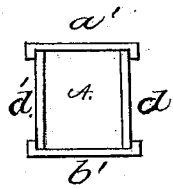
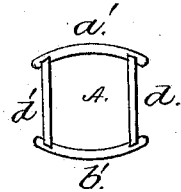
Attest:
S. Walter Fowler
Henry Glassie
Inventor:
Joel H. Page
By H. W. Glassie
His Attorney (No Model.) 4 Sheets—Sheet 4.
J. H. PAGE.
LAYING UNDERGROUND ELECTRIC WIRES.
No. 298,020. Patented May 6, 1884.
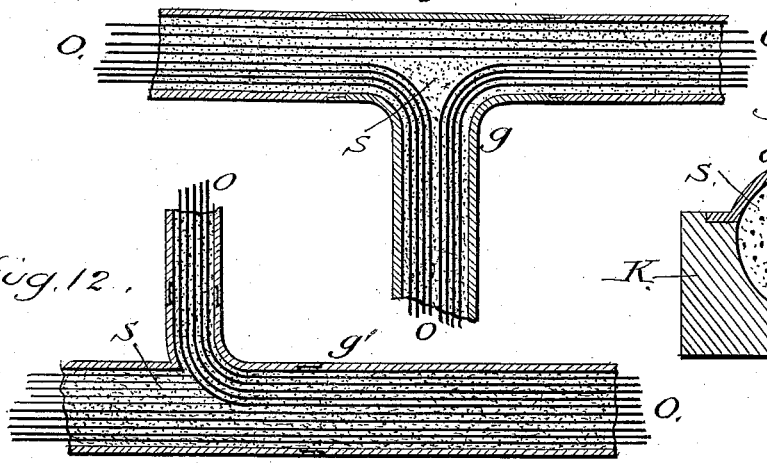
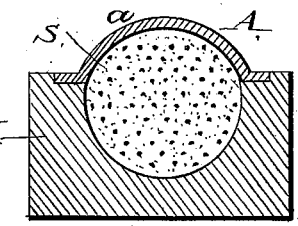
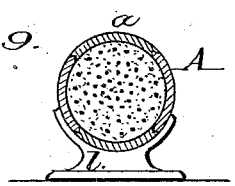
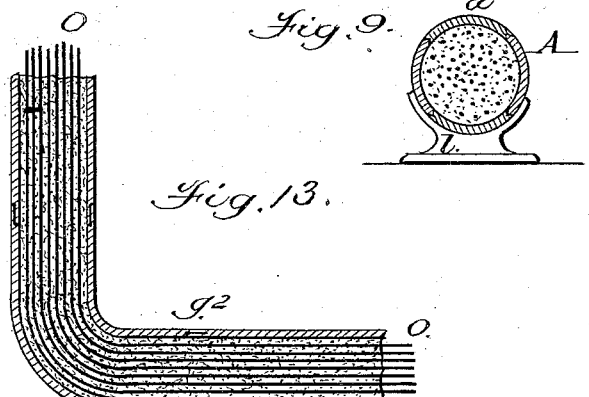
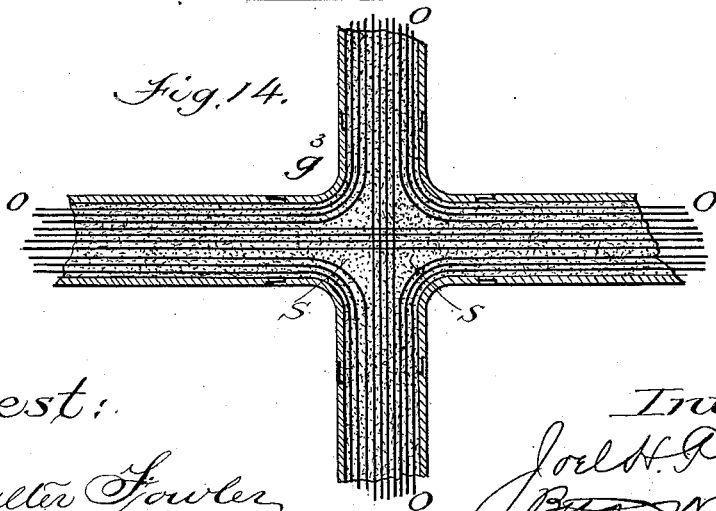
Attest:
S Walter Fowler
Henry Glassie
Inventor;
Joel H. Page
By Henry Glassie
His Attorney

UNITED STATES PATENT OFFICE.

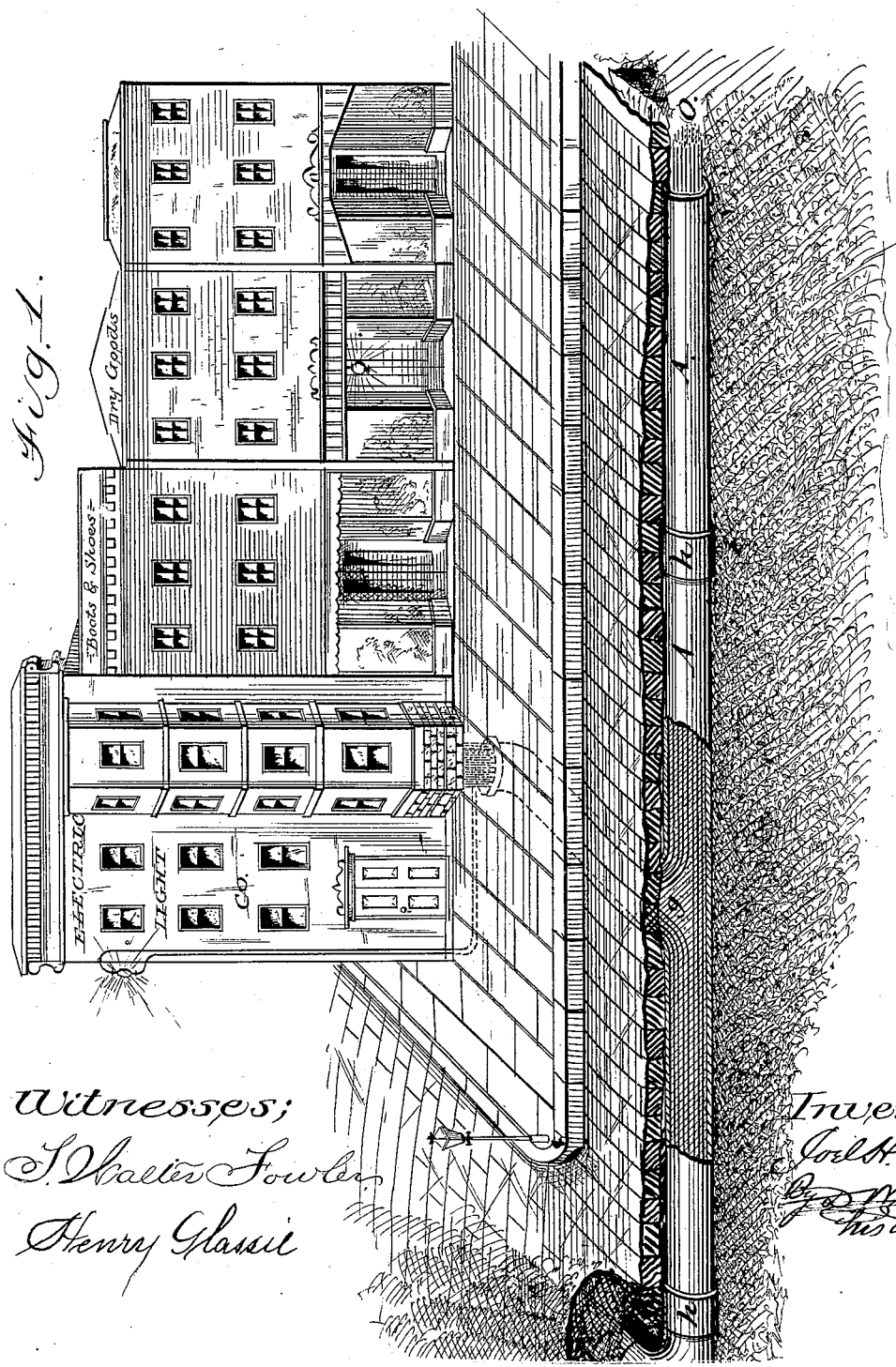

JOEL H. PAGE, OF PHILADELPHIA, PENNSYLVANIA, ASSIGNOR OF ONE-HALF TO BLANCH CARRIE KING, OF SAME PLACE.

LAYING UNDERGROUND ELECTRIC WIRES.

SPECIFICATION forming part of Letters Patent No. 298,020, dated May 6, 1884.

Application filed November 16, 1883. (No model.)

*To all whom it may concern:*

Be it known that I, JOEL H. PAGE, a citizen of the United States, residing at Philadelphia, in the county of Philadelphia and State of Pennsylvania, have invented certain new and useful Improvements in Laying Underground Electric Wires; and I do hereby declare the following to be a full, clear, and exact description of the invention, such as will enable others skilled in the art to which it appertains to make and use the same.

My invention has relation to new and useful improvements in conduits for carrying, as well as in the methods of laying, wires underground for electrical and other purposes; and it consists in providing a receptacle, of any desired form and dimensions and of any suitable material, so constructed that it can be extended indefinitely by introducing therein additional joints, and be made accessible, longitudinally, by being opened on the top or sides, or both, if desired; also, in so constructing the longitudinal sections of such a receptacle so that they can be joined together and made to form a continuation of the branching arms or intersecting corner angle-block for forming corners and intervening diverging angle-points at intervals along the line; also, in the manner of constructing and introducing the angle-conduits at the corners of streets or other intervening diverging points for the purpose of diverging the wires; also, in the mode of constructing such receptacles or conduits in longitudinal sections, so that the top or either of the sides can be removed and replaced at will without injury thereto.

It also consists in the method of laying, securing, and wholly insulating underground wires for telegraphic, telephonic, and other electrical purposes in such conduits and angle-blocks by embedding the wires separately and at suitable distances from each other in a moisture, damp, wet, cold, and heat repellent compound, which, being poured upon them in a plastic state, subsequently settles and becomes hard, and in communicating with the connecting-joints of such conduits through suitable connecting-boxes located along the line of the conduit, through which new and other connections may be made without disturbing the street or the conduits and their series of wires.

It further consists in bringing the wires so laid, when desired, through suitable diverging-angle conduits laterally and upward into testing-boxes raised at proper intervals and at convenient places along the line of conduits for locating a rupture and making other connections.

In the drawings the several letters of reference indicate corresponding parts.

Figure 1 is a perspective of a corner and side of a street with the roadway broken away, showing the location of the wire-conduit, the connecting-joints, as well as angle-conduits; also the conduit broken away to show three series of wires, one each from opposite directions, centering at one point, and one passing directly through. Fig. 2 is another perspective of the same, showing the sections of the conduits united by connecting-joints, showing an intervening angle conduit or block, a testing-box, and several man-holes communicating with the conduit. Fig. 3 is another view of the same, showing the interior of the testing-box and angle conduit or block. Fig. 4 is a fragment of one end of one form of the separable conduit. Fig. 5 is the same with one side piece advanced, to show the method of uniting them. Fig. 6 is an end elevation of the opposite or female end of the same. Fig. 7 is another fragment of the same, showing the female end partly broken away to show the interior shoulder. Fig. 8 represent the end elevation of two other forms of separable conduits. Fig. 9 is a cross-section of another form of conduit, showing the wires and compound in place and mode of arranging the top. Fig. 10 is a cross-section of another form of conduit, showing the wires and compound in place and the arrangement of the cover. Fig. 11 is a horizontal section of an intermediate angle conduit or block or section, the same as that shown in Fig. 1, but enlarged. Fig. 12 is a horizontal section of another form of intersecting angle conduit or block or elbow-joint, showing wires embedded in place. Fig. 13 is a horizontal section of a simple bent conduit, showing wires embedded in place. Fig. 14 is a horizontal section of a quadruple right-angle or corner angle conduit or block, showing wires extending in various directions.

The conduit-case A is preferably constructed in sections of two or more parts, of any form and length that experience may approve, and of a diameter to accommodate the service to be required of it, of glass, terra-cotta, artificial stone, wood, or any other cheap convenient material that will serve the purpose, as, after having served as a mold or for transporting and laying the conduit, so far as its practical use is concerned, ceases to be indispensable. I prefer, however, to so lay the conduit that the case A will remain in position and serve to protect it from exposure. To that end I have devised several forms of conduit-cases A. (Shown somewhat in detail in the drawings.) That shown in Figs. 4, 5, 6, and 7 may be cylindrical, octagonal, or hexagonal, and is constructed of a top piece, $a$, bottom piece, $b$, and two side pieces, $c$ $c'$, all dovetailed together, and the ends are so constructed that one end of one section will adjust in one end of another section. The parts being interconvertible, can be so put together when the conduit is laid that there will be no transverse joint—that is to say, the joints may be broken by advancing one or more pieces into the next section, as shown in Fig. 5.

The conduit-case A shown in Fig. 8 is also constructed of four pieces—the top $a'$, bottom $b'$, and sides $d$ $d'$; but instead of being cylindrical, it is more in the form of a parallelopiped, for convenience. I prefer this form of conduit-case, as it may be enlarged in either direction as the necessities demand—that is to say, by taking out the side pieces, $d$ $d'$, and introducing deeper sides, the case A can be enlarged in depth, and made to accommodate any number of more wires by laying and embedding them on top of the old ones without disturbing them. The conduit-case shown in Figs. 2 and 4 is a simple case, constructed in sections of suitable length, into which the wires and compound are introduced before laying, and the whole united together by connecting-joints $h$ $h$, and made to diverge through connecting angle-joints $g$, $g'$, $g^2$, or $g^3$. In this form of case A, after the wires have been embedded, the sections may be closed up, the wires being marked with tags or otherwise; and when laid for use the ends of two sections are brought in juxtaposition and arranged in either a connecting-joint, $h$, or one or other form of the angle-joints $g$, $g'$, $g^2$, or $g^3$, where the several wires of each may be connected in the usual way. This being done, the compound employed is introduced into the connecting-joint in a semi-fluid state, covering the entire series of wires between the ends of and thereby joining the two sections together. When the connecting-joint is filled, it is closed in the same manner as the sections A, thus forming one continuous conduit, and, as may readily be seen, this can be continued *ad infinitum*. Under certain circumstances and in some localities, owing to the lay or condition of the ground, a simple conduit and casing pipe or jacket will not answer to meet these exigencies. I have devised, therefore, and in Fig. 9 I show, a conduit-case, A, supported on a rest, $l$, and in Fig. 10 I show a conduit laid in a concrete or artificial-stone foundation, $k$, the utility of which will readily suggest itself to those having use for them.

As is apparent from the horizontal section shown, the several angle conduits or blocks $g$, $g'$, $g^2$, and $g^3$ are designed to afford easy and natural facilities for diverging and directing systems of wires in various directions and turning corners. These several angle-conduits, like the general conduit, are constructed of any suitable material, and are adapted to join onto and form an integral part of the conduit A, and for convenince they should be constructed of at least two pieces—the base and the top—so that they may be opened to afford facilities for laying the wires and for subsequently reaching them. The angle-conduit $g$ can be used as a conduit, as well as for diverging wires from two directions to a common center, or for directing all the wires from opposite directions to a common center, or for diverging wires from common centers in two or more directions, as shown in Fig. 2. The angle-conduit $g'$ is designed to divide the wires carried through it and conduct them in two directions. The angle-conduit $g^2$ is a simple bend, to turn a single corner or to pass an obstruction, while the quadruple right-angle, angle-conduit, $g^3$, is designed to serve as a conduit for system of wires crossing each other, as well as to diverge wires in several directions.

In laying the wires in the angle-conduits, the conduit is left uncovered, and the wires comprising each diverging system are separated from the others and grouped together in the direction it is desired they shall take. They are then held taut to a point near the turning-point and the compound poured upon them and permitted to set. The several angles are then formed and the compound poured upon the whole of the wires, after which the several diverging systems are followed out as in a longitudinal conduit, embedding each system in its own branch. It is obvious that when so laid the wires are secured in position without the interposition of anything that will disturb, distribute, or interfere with the electrical current, and that each wire will be wholly insulated. The longitudinal casing having been placed in position, as indicated, and uncovered, I arrange the entire series or system of wires to be laid therein in a taut group, parallel with and in close proximity to, say, not less than one-fourth of an inch from each other within the casing, and insulate each separate wire, protect and secure them in place simultaneously by pouring upon them a compound of glycerine and litharge, or litharge, asbestos, and glycerine, while in a semi-fluid or plastic state, and maintaining them in that position until the compound sets.

It is obvious that a continuous single wire, number of wires, or the entire series of wires to be set in one casing, may be laid simultaneously in a fixed receptacle or casing from suitable reels through separating-heads, by adjusting the wires in place and filling in the compound upon them behind the separating-head as it advances, *ad infinitum*, care being taken to cover the entire series of wires and hold them taut until the compound has set; but the more economical way is to lay the wire in short sections, lay the sections as they are required, and subsequently form connections with the wires at the intersections, and inclose the joints and connections within the connecting-joints, and then fill them up with the compound. When laid in this way, the wires can be reached through a man-hole, *r*, the compound broken away, and connections broken and new connections made, and defects discovered and remedied without disturbing the body of the wire; and should it be necessary to do so, by breaking the connections at each end an entire section may be taken up and replaced without serious loss, or materially interfering with the business of the line, the operation of replacing a section taking but a few moments.

*n* is a testing-box, something like a hydrant, set in a convenient position and at suitable intervals. Into this box the ends *o* of two entire series of wires may be brought and exposed above the body of the compound *s*, so that connections may be made and broken, the several wires tested, and defects located. This testing-box may be closed and fastened by any approved mode of fastening.

The man-hole *r* is a small hole, either walled up or lined with any convenient material, and covered with a suitable trap or cover, and need be but large enough to allow of reaching the joints *h* of the pipe A, to make or break connections or test the wires. In localities where numerous wires are used and ramify into nearly every house, the advantage of these numerous connecting-joints will readily be apparent.

In laying the wires in the conduit, at first it will be economy to embed a larger number than are actually required at the time, by which precaution new connections can easily be made through the joints *h*, and the wires, or any number of them, carried to the houses along the line or diverted to other points, and should it prove that one or more sections of the wire in use has become defective, it can be disconnected at the nearest point, and connection made with and continued through a sound wire. Wires laid in this way, and in the compound herein mentioned, are wholly excluded from atmospheric action, from moisture, damp, wet, heat, and cold, and are subject to no strain upon them, being simply conduits for an electrical current, for which reasons the danger of destruction, of damage, or injury to them is exceedingly remote. Consequently they need not be large, heavy wires, and the user may make up in numbers what is saved in bulk. In addition to being wholly protected, the compound employed being absolutely a non-conductor, the wires are thoroughly insulated, though they be brought to within one-fourth to three-eighths of an inch of each other.

I am aware that others have heretofore undertaken to lay wires underground, embedded in cement and compound, in conduits prepared for the purpose, and also that such inventors undertake to turn corners with such wires, for which reason I do not assume to claim these ideas, broadly. Therefore,

Having now fully described my invention, what I esteem as new, and seek to protect by Letters Patent, is—

1. In forming angles in and turning corners with systems of wires laid underground for telegraphic and other electrical purposes, the method of simultaneously laying, protecting, securing, and wholly insulating severally each wire, by arranging and holding in suspension in close proximity to each other to the point of divergence the desired number of wires, and pouring upon them simultaneously an insulating compound, until the whole are embedded to that point, and after the compound has set making the desired diversions, and repeating the operation in the new directions of the several wires, substantially as shown and described.

2. For laying systems of underground wires for telegraphic, telephonic, and other electrical purposes, an extensible jointed conduit-case consisting of removable parts longitudinally dovetailed to engage and secure and made interchangeable with each other, so that the conduit may be extended to any desired length, and be free from lateral joints, substantially as shown and described.

3. A longitudinal conduit-case consisting of top, bottom, and side pieces, quartered longitudinally, and dovetailed to adjust into and secure each other, the whole made continuous through intersecting joints, in combination with a system of underground wires for telegraphic and other electrical purposes, secured and insulated by being wholly embedded in an insulating compound, substantially as shown and described.

4. In systems for underground wires for telegraphic, telephonic, and other electrical purposes, the combination of longitudinal conduit A, angle-joint *g*, lateral and vertical ducts, and test-box *n*, the latter above the surface of the street, securing, protecting, and insulating compound *s*, and systems of wires *o*, substantially as shown, and for the purpose described.

5. In combination, systems of wires *o* for telegraphic, telephonic, and other electrical purposes, insulating and protecting compound *s*, conduit-case A, connecting-joints *h*, and man-holes $r$, for reaching, testing, and repairing defects, together with angle-joints $g$, lateral and vertical ducts, and test-box $n$, above the surface of the street, the whole constructed and arranged substantially as shown and described.

6. In systems of wires for electrical purposes laid underground in common conduits, the combination of the longitudinal casing A, comprising top, bottom, and side parts, and intersecting receiving connecting-sections, hollow intersecting angle-joints $g$ $g'$ $g^2$ $g^3$, having openings at diverging angles to each other, insulating, securing, and protecting compound $s$, systems of wires $o$, embedded therein, man-holes $r$, for reaching the conduit, and laterally-arranged test-boxes $n$, rising above the surface of the street, substantially as shown and described.

7. Angle-conduits separable horizontally into top, bottom, and intervening side pieces, forming a simple hollow empty case, accessible from the top and side, provided with diverging outlets through branching arms, as shown, and designed and arranged for separating and diverging in various directions systems of wires laid underground for electrical purposes, substantially as and for the purpose described.

8. An angle-conduit consisting of a simple hollow horizontally-separable empty case, accessible from the top and sides, constructed of top, bottom, and intervening side pieces, and provided with diverging outlets through branching arms, and designed and arranged for separating and diverging in various directions systems of wires laid underground for telegraphic, telephonic, and other electrical purposes, in combination with an insulating compound, $s$, and systems of wires $o$, laid therein, substantially as shown and described.

In testimony whereof I have affixed my signature in presence of two witnesses.

JOEL H. PAGE.

Witnesses:
WM. L. NEVIN,
AUG. W. KING.